United States Patent
Schrimper

(10) Patent No.: US 8,720,879 B1
(45) Date of Patent: May 13, 2014

(54) FOOD PREPARATION CUTTING BOARD AND ASSOCIATED METHOD

(76) Inventor: James L. Schrimper, Columbia City, IN (US)

( * ) Notice: Subject to any disclaimer, the term of this patent is extended or adjusted under 35 U.S.C. 154(b) by 447 days.

(21) Appl. No.: 13/162,057

(22) Filed: Jun. 16, 2011

(51) Int. Cl.
*B23Q 3/00* (2006.01)
*A47J 47/00* (2006.01)
*B26D 1/02* (2006.01)

(52) U.S. Cl.
CPC ............... *A47J 47/00* (2013.01); *A47J 47/005* (2013.01); *B23Q 3/00* (2013.01); *B26D 1/02* (2013.01)
USPC ........................................ 269/289 R; 269/16

(58) Field of Classification Search
CPC .................................. B23Q 3/00; A47J 47/00
USPC ..................... 269/289 R, 290, 293, 16, 302.1
See application file for complete search history.

(56) References Cited

U.S. PATENT DOCUMENTS

2003/0094744 A1* 5/2003 Scott .......................... 269/289 R
2009/0243175 A1* 10/2009 Shew et al. ...................... 269/16

* cited by examiner

*Primary Examiner* — Lee D Wilson
*Assistant Examiner* — Seahee Yoon

(57) ABSTRACT

A food preparation cutting board for cutting and storing food stuff in isolated compartments adjacent to the cutting board preferably includes a cutting board including a plurality of openings formed along a perimeter thereof, and a plurality of food containers removably interfitted within the openings respectively such that the food containers are juxtaposed adjacent to the perimeter of the cutting board. The food containers are fixedly engaged with the cutting board when the food containers are disposed within the openings respectively. Such food containers are capable of may be interchangeably oriented at an upright position and an inverted position relative to the cutting board. In this manner, the food containers are adapted to receive food stuff directly from the cutting board. Furthermore, a user is able to expand the surface area of the cutting board and/or conveniently slide food stuff into the food containers directly from the cutting board.

14 Claims, 8 Drawing Sheets

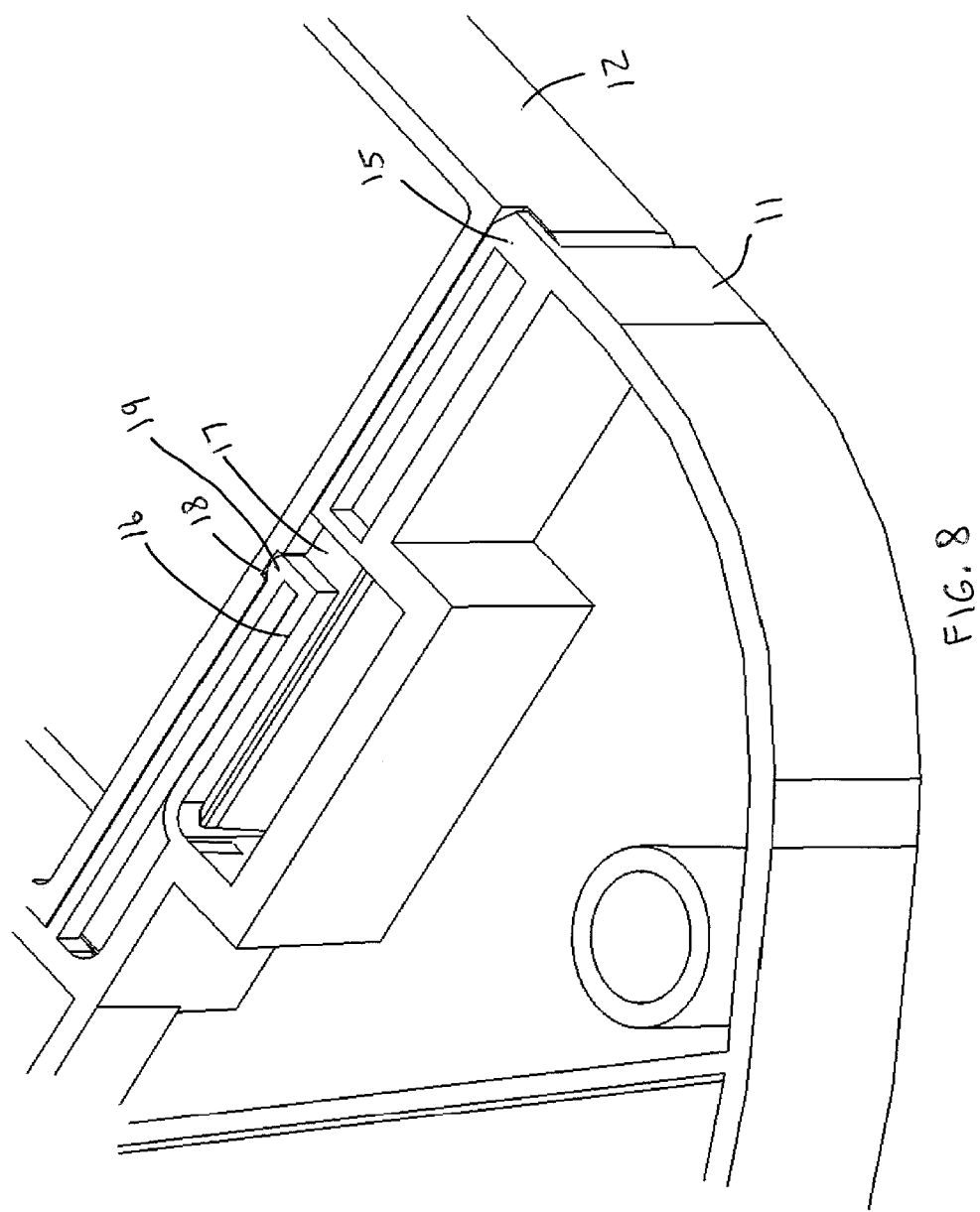

FOOD PREPARATION CUTTING BOARD AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to food preparation boards and, more particularly, to a portable food preparation cutting board having a plurality of removable cup containers for holding and storing food items.

2. Prior Art

Food preparation boards are generally used in combination with kitchen utensils to facilitate the preparation of food-related items. There is often a need to cut or otherwise form food items to predetermined sizes while cooking. Such cutting boards are primarily designed to provide a cutting surface on which to cut food and other materials while protecting a countertop.

Cutting food articles and other material to a specific quantity is often desired, i.e., a predetermined quantity of onions, tomatoes, mushrooms, etc. Fluid seeping from articles during the cutting process promotes the slippage and shifting of articles creating an unsafe environment. Hence, cutting boards generally possess non-slip characteristics on the cutting surface which help to engage and retain cut articles. However, providing the non-slip characteristics over the entire cutting surface may be inconvenient in some instances because such a surface provides resistance to the transfer of chopped articles from the cutting surface of the cutting board to a desired location. Furthermore, transferring such chopped articles by hand or by cutting implement proves to be inefficient and dangerous for obvious reasons.

None of the prevalent prior art cutting boards provide an effective means for both measuring and storing chopped articles and facilitating the transfer of chopped articles from the cutting surface of the cutting board to a storage container adjacent to the cutting board, in an efficient manner with minimum resistance.

Accordingly, a need remains for food preparation board in order to overcome the above-noted shortcomings. The present invention satisfies such a need by providing a food preparation board that is convenient and easy to use, lightweight yet durable in design, versatile in its applications, and designed for easily and conveniently receiving and storing chopped articles in isolated compartments adjacent to the cutting board.

BRIEF SUMMARY OF THE INVENTION

In view of the foregoing background, it may be therefore an object of the present invention to provide a food preparation cutting board for receiving and storing chopped articles in isolated compartments adjacent to the cutting board. These and other objects, features, and advantages of the invention are provided by a food preparation cutting board for cutting and storing food stuff. Such food preparation cutting board preferably includes a cutting board including a plurality of openings formed along a perimeter thereof, and a plurality of food containers removably interfitted within the openings respectively such that the food containers are juxtaposed adjacent to the perimeter of the cutting board. Notably, the food containers are fixedly engaged with the cutting board when the food containers are disposed within the openings respectively. Such food containers are capable of may be interchangeably oriented at an upright position and an inverted position relative to the cutting board. In this manner, the food containers are adapted to receive food stuff directly from the cutting board.

In a non-limiting exemplary embodiment, the food containers may be slidably displaced along a bi-directional linear travel path when removably interfitted within the openings. Such a bi-directional linear travel path may be registered parallel to a top surface of the cutting board.

In a non-limiting exemplary embodiment, the food containers may linearly travel towards and away from the perimeter of the cutting board when respectively ingressing and egressing through the openings along the bi-directional linear travel path.

In a non-limiting exemplary embodiment, the cutting boards preferably include a plurality of guide rails located at an entry of the openings respectively, and a plurality of detents located at an ending of the openings respectively.

In a non-limiting exemplary embodiment, the guide rails may be substantially linear and protrude outwardly from the cutting board.

In a non-limiting exemplary embodiment, the detents may be resiliently biased along corresponding arcuate travels paths respectively located within the openings.

In a non-limiting exemplary embodiment, the guide rails may be axially aligned at an end-to-end pattern with the detents respectively.

In a non-limiting exemplary embodiment, the food containers may include a central cavity adapted to receive food stuff therein, a plurality of channels formed exterior of the central cavity, and a plurality of pockets in fluid communication with the channels and located exterior of the central cavity respectively. In this manner, the channels linearly receive the guide rails and the detents as the food containers are interfitted into the openings along the bi-directional linear travel path.

In a non-limiting exemplary embodiment, the pockets may extend inwardly and away from the detents such that a leading end of the detents removably sits within the pockets when the food containers are fully interfitted within the openings respectively.

The present disclosure may further include a method of utilizing a food preparation cutting board for cutting and storing food stuff. Such a method preferably includes the chronological steps of: providing a cutting board including a plurality of openings formed along a perimeter thereof; providing and removably interfitting a plurality of food containers within the openings respectively such that the food containers are juxtaposed adjacent to the perimeter of the cutting board; fixedly engaging the food containers with the cutting board when the food containers are disposed within the openings respectively; interchangeably orienting the food containers at an upright position and an inverted position relative to the cutting board; and the food containers receiving food stuff directly from the cutting board.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 8 is an enlarged partial view showing the structural relationship between the guide rails, detents, channels and pockets of an exemplary food container shown in FIG. 7.

Figure 1:
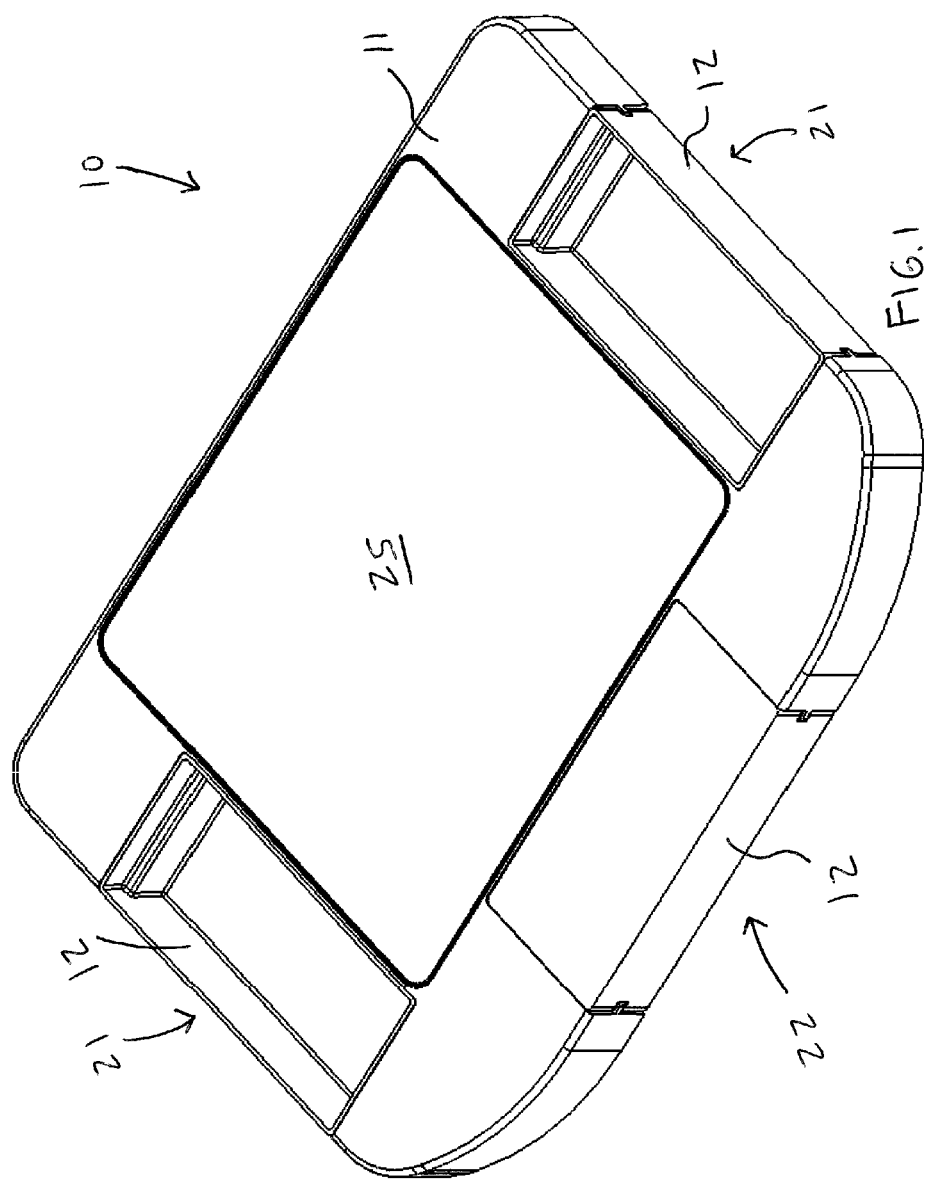
FIG. 1 is a perspective view showing a food preparation cutting board a plurality of food containers removably attached thereto wherein two of food containers are oriented upright and one food container is oriented at an inverted position, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

Figure 2:
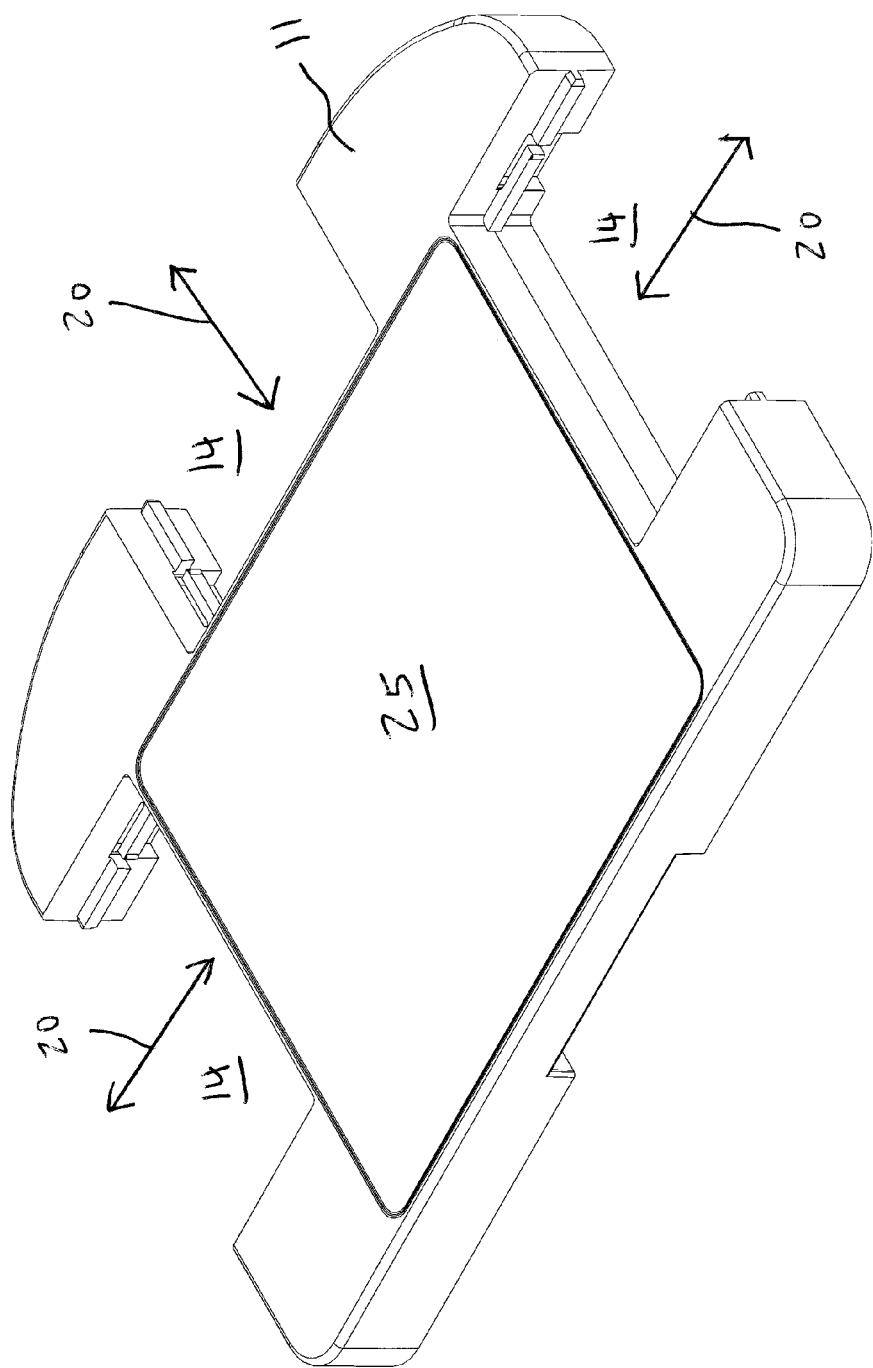
FIG. 2 is a perspective view of showing the food preparation cutting board of FIG. 1 with the food containers removed therefrom.
Figure 3:
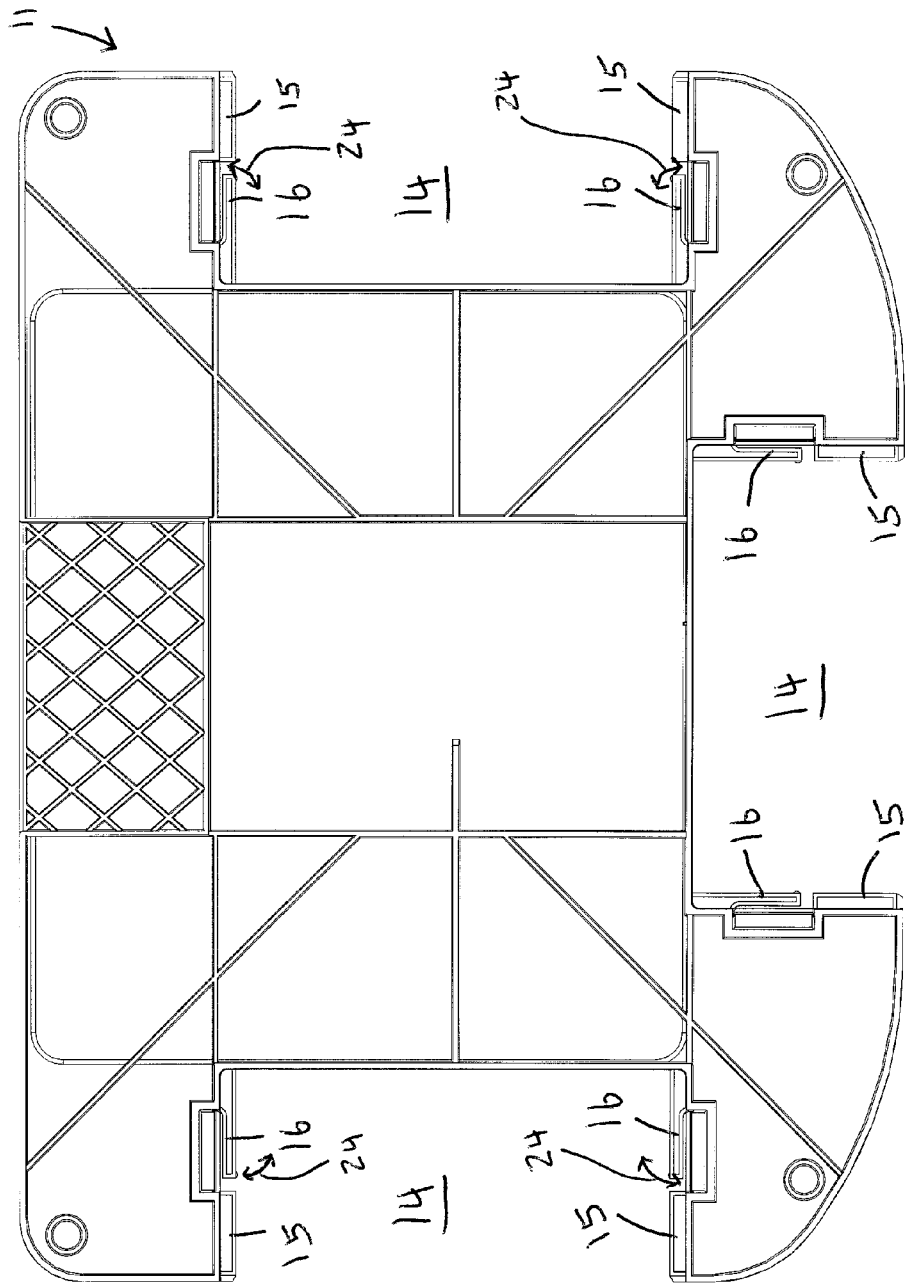
FIG. 3 is a bottom plan view of the cutting board shown in FIG. 2.
Figure 4:
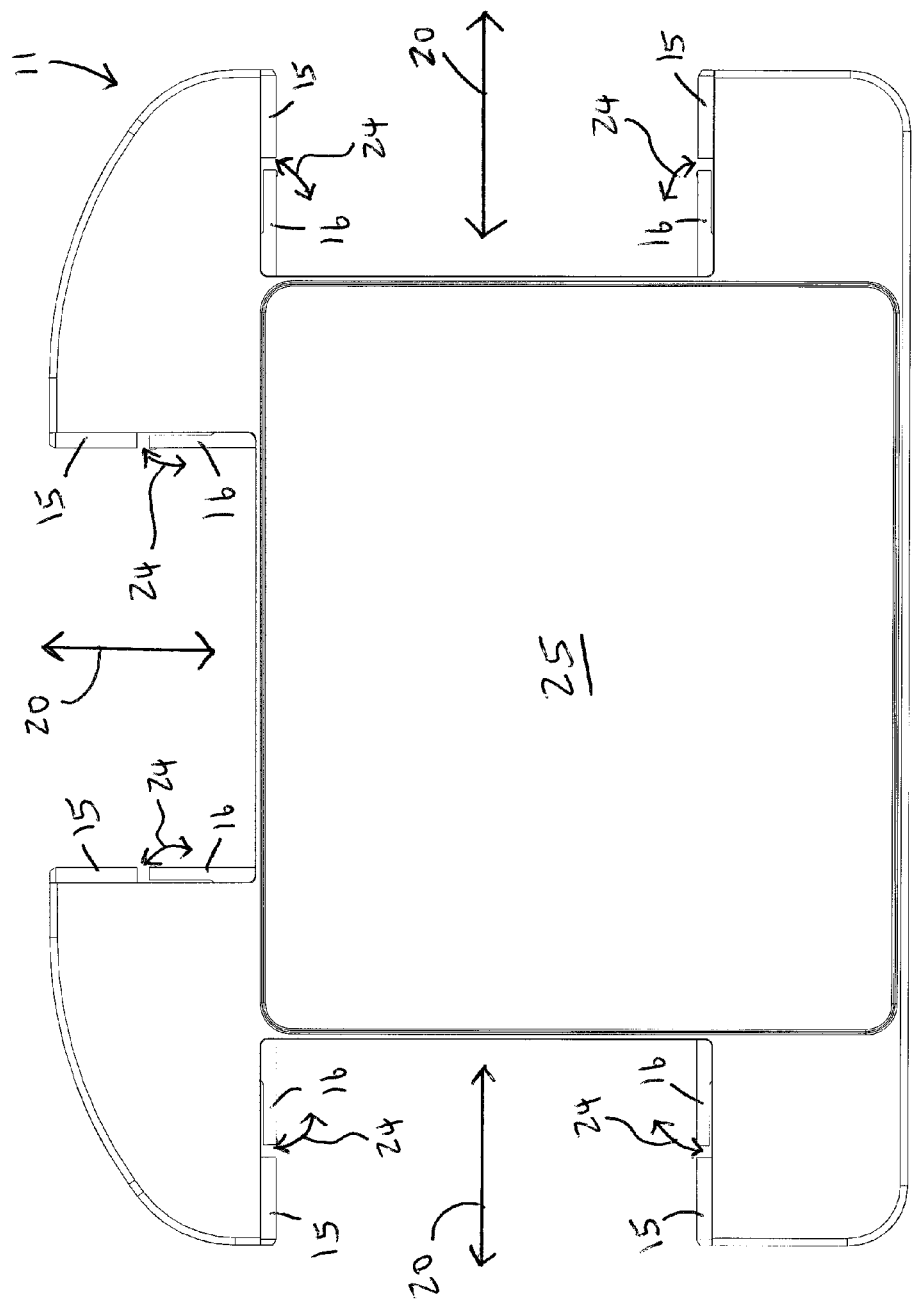
FIG. 4 is a top plan view of the cutting board shown in FIG. 2.
Figure 5:
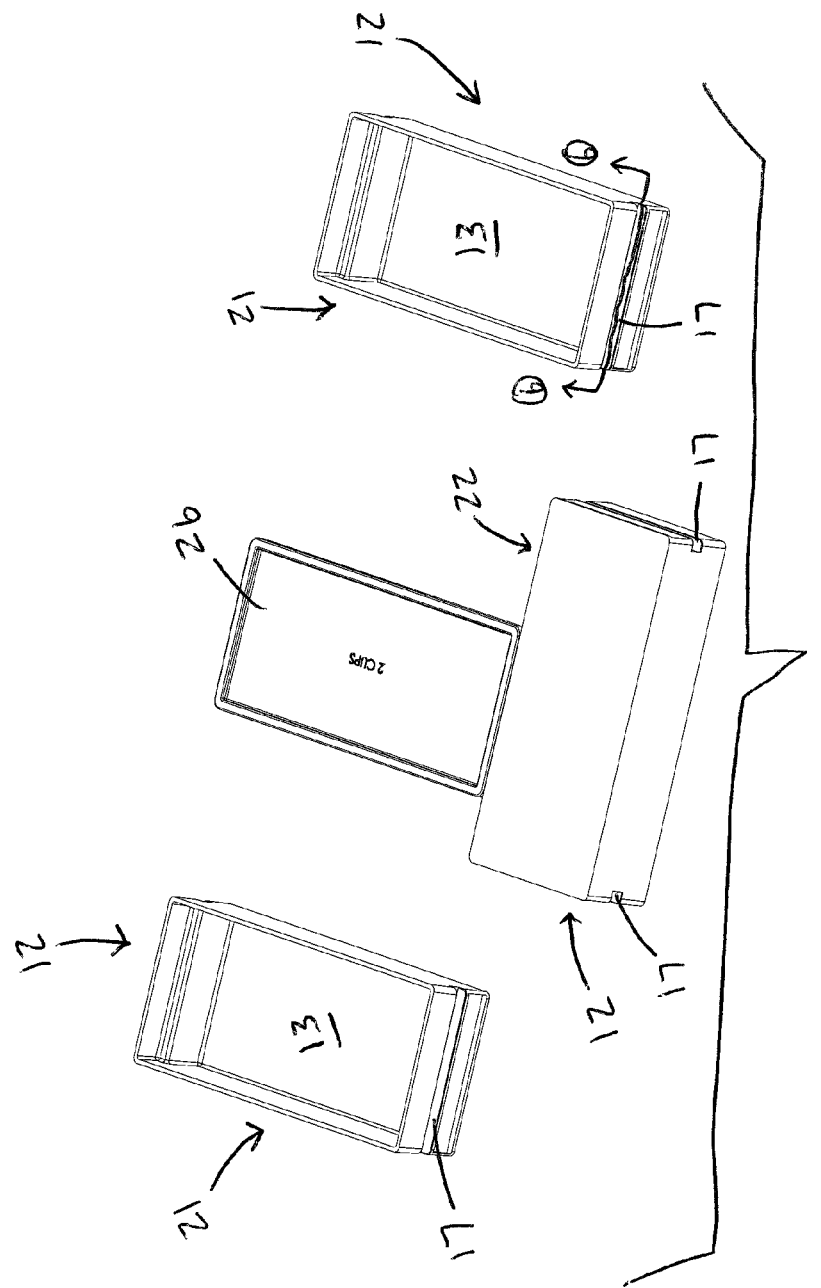
FIG. 5 is a perspective view of the food containers removed from the cutting board and a tray that may be used to measure food stuff and/or be positioned over an open top face of the food containers.
Figure 6:
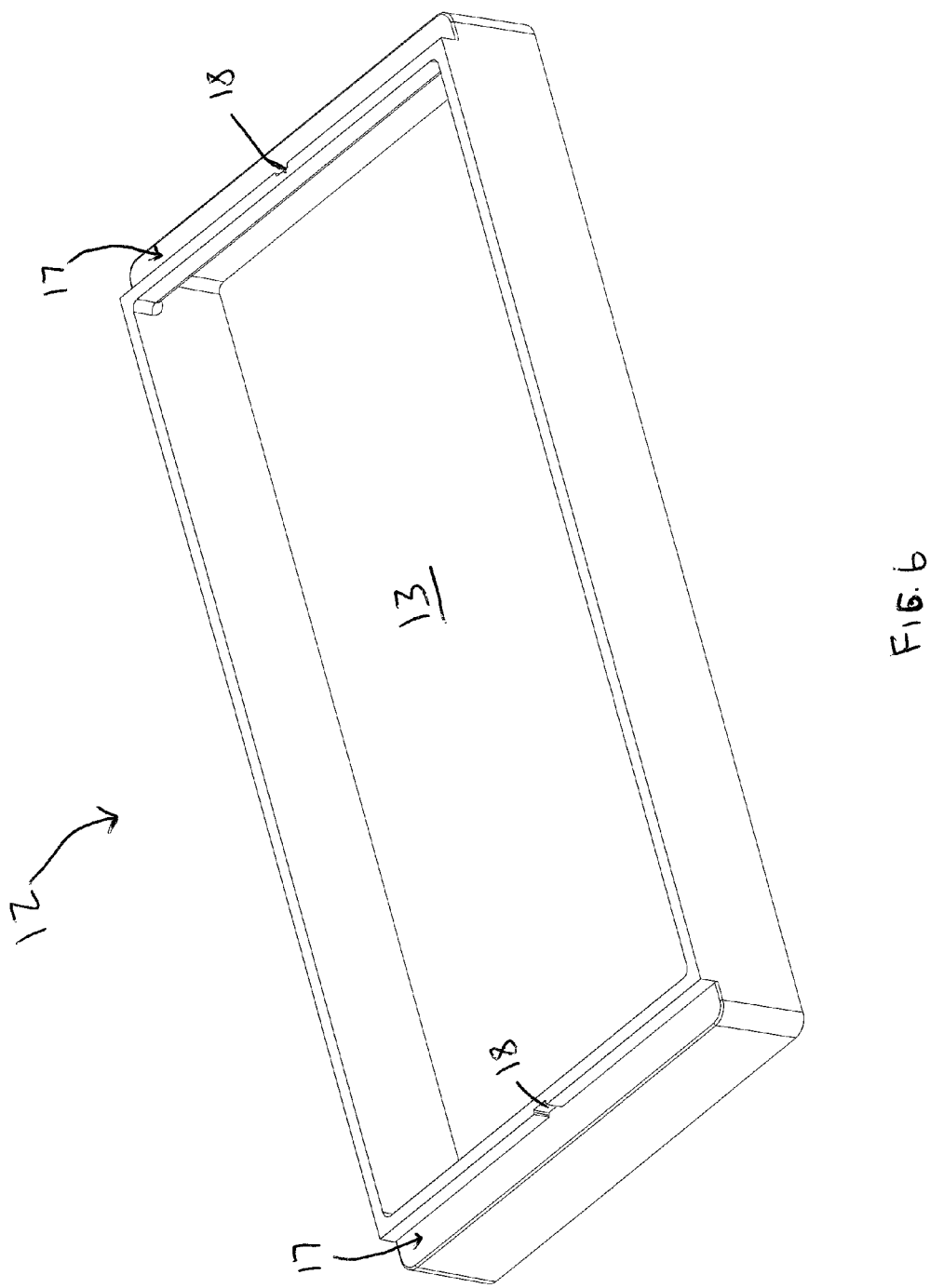
FIG. 6 is an enlarged cross-sectional view taken along line 6-6 in FIG. 5, showing the pocket formed in a channel of an exemplary food container.
Figure 7:
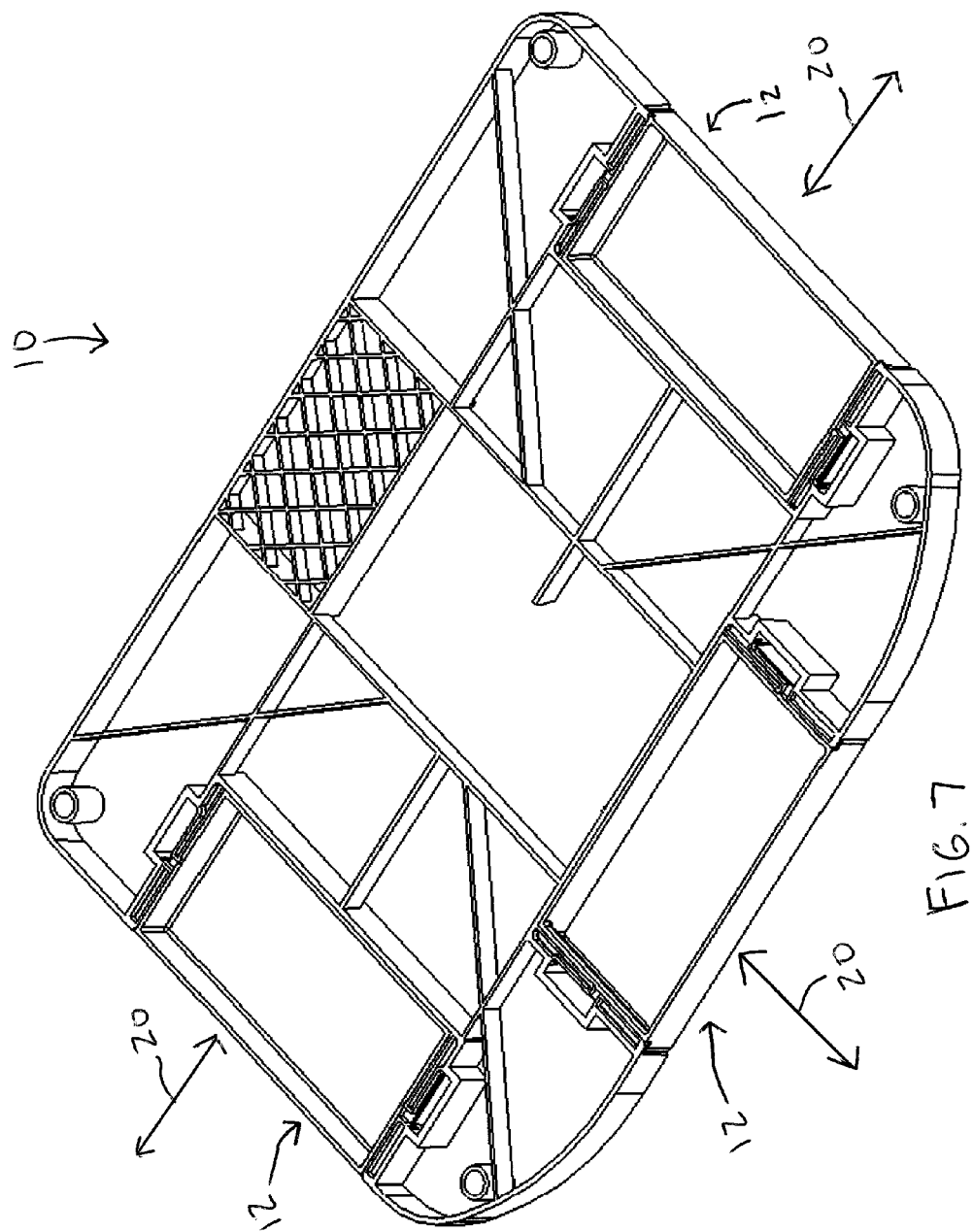
FIG. 7 is a perspective view showing the structural relationship between the guide rails, detents, channels and pockets when the food containers are removably interfitted within the openings, showing the interfitting relationship between the resilient tab of the cutting board and the channel of an exemplary container.

The apparatus of this invention is referred to generally in FIGS. 1-8 and is intended to provide a food preparing cutting board 10 for cutting and storing food stuff in separate food containers. It should be understood that the present invention may be used to cut and store many different types of food stuffs, and should not be limited to any single or particular group of food stuff.

Referring to FIGS. 1-8 in general, a food preparation cutting board 10 for receiving and storing chopped articles in isolated compartments adjacent to the cutting board 11. These and other objects, features, and advantages of the invention are provided by a food preparation cutting board 10 for cutting and storing food stuff. Such food preparation cutting board 10 preferably includes a cutting board 11 having a plurality of openings 14 formed along a perimeter thereof, and a plurality of food containers 12 removably interfitted within the openings 14 respectively such that the food containers 12 are juxtaposed adjacent to the perimeter of the cutting board 11.

Advantageously, the food containers 12 are fixedly engaged with the cutting board 11 when the food containers 12 are disposed within the openings 14 respectively. Such food containers 12 are capable of being interchangeably oriented at an upright position 21 and an inverted position 22 relative to the cutting board 11. In this manner, the food containers 12 are adapted to receive food stuff directly from the cutting board 11, if needed. Such a structural configuration provides the unexpected and unpredictable advantage of permitting a user to expand the surface area of the cutting board 11 and/or conveniently slide food stuff into the food containers 12 directly from the cutting board 11.

In a non-limiting exemplary embodiment, the food containers 12 may be slidably displaced along a bi-directional linear travel path 20 when removably interfitted within the openings 14. Such a bi-directional linear travel path 20 may be registered parallel to a top surface 25 of the cutting board 11. Such a structural configuration provides the unexpected and unpredictable advantage of ensuring the expanded surface area of the cutting board 11 is planar when transitioning to the food containers 12.

Alternately, a tray 26 may be positioned over the open top end of the food containers 12 rather than inverting the food containers 12 from the upright position 21 to the inverted position 22.

In a non-limiting exemplary embodiment, the food containers 12 may linearly travel towards and away from the perimeter of the cutting board 11 along the bi-directional linear travel path 20 when respectively ingressing and egressing through the openings 14. Such a structural configuration provides the unexpected and unpredictable advantage of ensuring the food containers 12 are securely and contemporaneously transferred with the cutting board 11 and do not prematurely detach therefrom during transport.

In a non-limiting exemplary embodiment, the cutting board 11 preferably includes a plurality of guide rails 15 located at an entry of the openings 14 respectively, and a plurality of detents 16 located at an ending of the openings 14 respectively.

In a non-limiting exemplary embodiment, the guide rails 15 may be substantially linear and protrude outwardly from the cutting board 11.

In a non-limiting exemplary embodiment, the detents 16 may be resiliently biased along corresponding arcuate travels paths 24 respectively located within the openings 14.

In a non-limiting exemplary embodiment, the guide rails 15 may be axially aligned at an end-to-end pattern with the detents 16 respectively.

In a non-limiting exemplary embodiment, the food containers 12 may include a central cavity 13 adapted to receive food stuff therein, a plurality of channels 17 formed exterior of the central cavity 13, and a plurality of pockets 18 in fluid communication with the channels 17 wherein such pockets 18 may be located exterior of the central cavity 13 respectively. In this manner, the channels 17 linearly receive the guide rails 15 and the detents 16 as the food containers 12 are interfitted into the openings 14 along the bi-directional linear travel path 20. Such a structural configuration provides the unexpected and unpredictable advantage of enabling a user to quickly and effectively lock the food containers 12 at an engaged position and thereafter easily and effectively removing the food containers 12 from the openings 14 by simply pulling the food containers 12 outwardly and away from the openings 14 in a substantially manner.

In a non-limiting exemplary embodiment, the pockets 18 may extend inwardly and away from the detents 16 such that a leading end 19 of the detents 16 removably sits within the pockets 18 when the food containers 12 are fully interfitted within the openings 14, respectively. In this manner, the detents 16 may be resilient and maintain a suitable frictional force with the pockets 18 to prevent premature displacement of the food containers 12 away from the openings 14.

The present disclosure may further include a method of utilizing a food preparation cutting board 10 for cutting and storing food stuff. Such a method preferably includes the chronological steps of: providing a cutting board 11 including a plurality of openings 14 formed along a perimeter thereof; providing and removably interfitting a plurality of food containers 12 within the openings 14, respectively such that the food containers 12 are juxtaposed adjacent to the perimeter of the cutting board 11; fixedly engaging the food containers 12 with the cutting board 11 when the food containers 12 are disposed within the openings 14, respectively; interchangeably orienting the food containers 12 at an upright position 21 and an inverted position 22 relative to the cutting board 11; and the food containers 12 receiving food stuff directly from the cutting board 11. Such method steps provide the unexpected and unpredictable advantage of permitting a user to selectively expand the surface area of the cutting board 11 and/or conveniently slide food stuff into the food containers 12 directly from the cutting board 11.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A food preparation cutting board for cutting and storing food stuff, said food preparation cutting board comprising:
    a portable cutting board including a plurality of openings formed along a perimeter thereof; and
    a plurality of food containers removably interfitted within said openings respectively such that said food containers are juxtaposed adjacent to said perimeter of said cutting board;
    wherein said food containers are adapted to receive food stuff directly from said cutting board;
    wherein said food containers are fixedly engaged with said cutting board when said food containers are disposed within said openings respectively;

wherein said food containers are interchangeably oriented at an upright position and an inverted position relative to said cutting board;
wherein said cutting board comprises
a plurality of guide rails located at an entry of said openings respectively, and
a plurality of detents located at an ending of said openings respectively;
wherein said guide rails are substantially linear and protrude outwardly from said cutting board.

2. The food preparation cutting board of claim 1, wherein said food containers are slidably displaced along a bi-directional linear travel path when removably interfitted within said openings, said bi-directional linear travel path being registered parallel to a top surface of said cutting board.

3. The food preparation cutting board of claim 2, wherein said food containers linearly travel towards and away from said perimeter of said cutting board when respectively ingressing and egressing through said openings along said bi-directional linear travel path.

4. The food preparation cutting board of claim 1, wherein said detents are resiliently biased along corresponding arcuate travels paths respectively located within said openings.

5. The food preparation cutting board of claim 1, wherein said guide rails are axially aligned at an end-to-end pattern with said detents respectively.

6. The food preparation cutting board of claim 1, wherein said food containers comprise:
a central cavity adapted to receive food stuff therein;
a plurality of channels formed exterior of said central cavity; and
a plurality of pockets in fluid communication with said channels and located exterior of said central cavity respectively;
wherein said channels linearly receive said guide rails and said detents as said food containers are interfitted into said openings along a bi-directional linear travel path.

7. The food preparation cutting board of claim 6, wherein said pockets extend inwardly and away from said detents such that a leading end of said detents removably sits within said pockets when said food containers are fully interfitted within said openings respectively.

8. A food preparation cutting board for cutting and storing food stuff, said food preparation cutting board comprising:
a cutting board including a plurality of openings formed along a perimeter thereof; and
a plurality of food containers removably interfitted within said openings respectively such that said food containers are juxtaposed adjacent to said perimeter of said cutting board;
wherein said food containers are adapted to receive food stuff directly from said cutting board;
wherein said food containers are fixedly engaged with said cutting board when said food containers are disposed within said openings respectively;
wherein said food containers are capable of being interchangeably oriented at an upright position and an inverted position relative to said cutting board;
wherein said cutting board comprises
a plurality of guide rails located at an entry of said openings respectively, and
a plurality of detents located at an ending of said openings respectively;
wherein said guide rails are substantially linear and protrude outwardly from said cutting board.

9. The food preparation cutting board of claim 8, wherein said food containers are slidably displaced along a bi-directional linear travel path when removably interfitted within said openings, said bi-directional linear travel path being registered parallel to a top surface of said cutting board.

10. The food preparation cutting board of claim 9, wherein said food containers linearly travel towards and away from said perimeter of said cutting board when respectively ingressing and egressing through said openings along said bi-directional linear travel path.

11. The food preparation cutting board of claim 8, wherein said detents are resiliently biased along corresponding arcuate travels paths respectively located within said openings.

12. The food preparation cutting board of claim 8, wherein said guide rails are axially aligned at an end-to-end pattern with said detents respectively.

13. The food preparation cutting board of claim 8, wherein said food containers comprise:
a central cavity adapted to receive food stuff therein;
a plurality of channels formed exterior of said central cavity; and
a plurality of pockets in fluid communication with said channels and located exterior of said central cavity respectively;
wherein said channels linearly receive said guide rails and said detents as said food containers are interfitted into said openings along a bi-directional linear travel path.

14. The food preparation cutting board of claim 13, wherein said pockets extend inwardly and away from said detents such that a leading end of said detents removably sits within said pockets when said food containers are fully interfitted within said openings respectively.

* * * * *